(12) United States Patent
Cambron et al.

(10) Patent No.: US 11,260,531 B2
(45) Date of Patent: Mar. 1, 2022

(54) END EFFECTOR CALIBRATION ASSEMBLIES, SYSTEMS, AND METHODS

(71) Applicant: Advanced Solutions Life Sciences, LLC, Louisville, KY (US)

(72) Inventors: Scott Douglas Cambron, Louisville, KY (US); Kyle Eli, Louisville, KY (US)

(73) Assignee: Advanced Solutions Life Sciences, LLC, Louisville, KY (US)

( * ) Notice: Subject to any disclaimer, the term of this patent is extended or adjusted under 35 U.S.C. 154(b) by 133 days.

(21) Appl. No.: 16/152,954

(22) Filed: Oct. 5, 2018

(65) Prior Publication Data

US 2019/0105780 A1    Apr. 11, 2019

Related U.S. Application Data

(60) Provisional application No. 62/568,869, filed on Oct. 6, 2017.

(51) Int. Cl.
*B25J 9/16* (2006.01)

(52) U.S. Cl.
CPC .......... *B25J 9/1692* (2013.01); *B25J 9/1664* (2013.01); *B25J 9/1697* (2013.01)

(58) Field of Classification Search
CPC ....... B25J 9/1664; B25J 9/1692; B25J 9/1697
See application file for complete search history.

(56) References Cited

U.S. PATENT DOCUMENTS

| | | | | |
|---|---|---|---|---|
| 5,706,408 | A * | 1/1998 | Pryor | B25J 9/1692 700/259 |
| 6,617,146 | B1 * | 9/2003 | Naccarato | C12M 33/04 435/243 |
| 8,180,487 | B1 | 5/2012 | Vangal-Ramanurthy et al. | |
| 10,039,219 | B1 * | 7/2018 | Vangal-Ramamurthy | B25J 9/023 |
| 2001/0010539 | A1 * | 8/2001 | Arimatsu | G05B 19/404 348/86 |
| 2011/0029132 | A1 | 2/2011 | Nemmers et al. | |
| 2014/0118531 | A1 * | 5/2014 | Franklin | G02F 1/1303 348/95 |
| 2014/0365006 | A1 * | 12/2014 | Trompeter | B25J 9/1692 700/254 |

(Continued)

OTHER PUBLICATIONS

International Search Report and Written Opinion dated Jan. 8, 2019 relating to International Application No. PCT/US2018/054621.

(Continued)

*Primary Examiner* — Rachid Bendidi
(74) *Attorney, Agent, or Firm* — Dinsmore & Shohl LLP

(57) ABSTRACT

An end effector calibration assembly includes an electronic controller, a first camera assembly communicatively coupled to the electronic controller, and a second camera assembly communicatively coupled to the electronic controller. A first image capture path of the first camera assembly intersects a second image capture path of the second camera assembly. The electronic controller receives image data from the first camera assembly, receives image data from the second camera assembly, and calibrates a position of the robot end effector based on the image data received from the first camera assembly and the second camera assembly.

14 Claims, 14 Drawing Sheets

(56) References Cited

U.S. PATENT DOCUMENTS

| | | | |
|---|---|---|---|
| 2015/0158180 A1* | 6/2015 | Trompeter | B25J 9/1692 |
| | | | 700/254 |
| 2015/0266183 A1 | 9/2015 | Alifragkis et al. | |
| 2016/0279800 A1* | 9/2016 | Onda | B25J 9/1697 |
| 2017/0274534 A1 | 9/2017 | Takahashi | |
| 2018/0126553 A1* | 5/2018 | Corkum | B25J 9/1692 |

OTHER PUBLICATIONS

Extended European Search Report related to EP Appln No. 18864753.1 dated May 31, 2021.

* cited by examiner

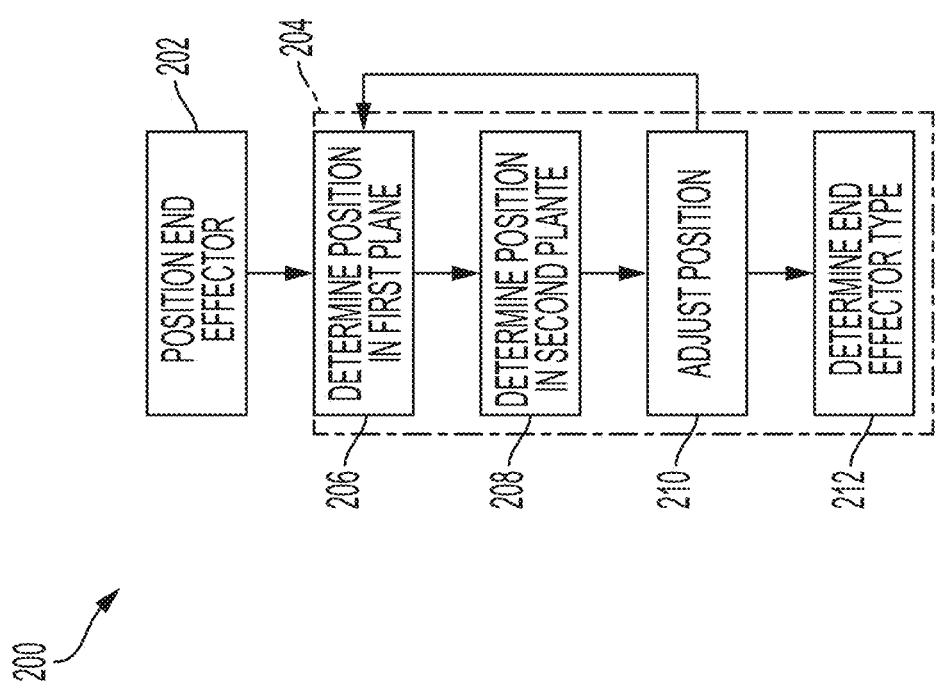

END EFFECTOR CALIBRATION ASSEMBLIES, SYSTEMS, AND METHODS

CROSS-REFERENCE TO RELATED APPLICATIONS

This application claims the benefit of U.S. Provisional Application Ser. No. 62/568,869, filed Oct. 6, 2017, and entitled "Camera Based Object Detection and Calibration System having Six Degrees of Freedom," the entirety of which is incorporated by reference herein.

TECHNICAL FIELD

The present specification generally relates to calibration of a robot end effector and, more specifically, assemblies, systems, and methods for calibrating a robot end effector.

BACKGROUND

The first industrial robot was developed in the 1950's. Over the past half century robotic technology has continued to improve in many ways from increased speed, improved precision, increased mobility from, for example, 3-Axis gantry systems to 6 and 7 Axis robotic arm assemblies. Movements and control of said robotic systems have become more and more complex, requiring teams of engineers to determine methods to not only program these complex moves but also determine processes and workflows to confirm and validate the actual location and trajectory of the robot and what it is carrying. Applications for robotic arms employing an end effector attached thereto include, but are not limited to: MIG welding where the end of the welding wire must be known for precise and repeatable welds for structural applications, pick and place grippers that requires precise position of CMOS chips in a printed circuit board assembly process, dispensing needles that requires precise positioning of the needle tip with respect to the print stage and other printed structures, surgical scalpels that requires precise positioning to cut and separate tissue from a living specimen.

Accordingly, in light of the possible end effector applications, a need exists for a method of calibrating the location and orientation of an end effector tip regardless of geometry or form factor is desirable. Proper calibration may ensure that the location and orientation of an end effector tip is known and that spatial information can be translated and geometrically transformed into a preprogrammed robot coordinate system.

Conventional calibration techniques include passing the end effector through an infrared beam to break the infrared beam. Based on where the beam is broken, the position of the end effector may be determined. However, such processes may require several passes through the infrared beam before the position of the end effector is properly calibrated. Such processes accordingly may be slow and cumbersome. Accordingly, new end effector calibration assemblies, systems, and methods addressing these issues are desirable.

SUMMARY

In one embodiment, an end effector calibration assembly includes an electronic controller, a first camera assembly communicatively coupled to the electronic controller, and a second camera assembly communicatively coupled to the electronic controller. A first image capture path of the first camera assembly intersects a second image capture path of the second camera assembly. The electronic controller receives image data from the first camera assembly, receives image data from the second camera assembly, and calibrates a position of the robot end effector based on the image data received from the first camera assembly and the second camera assembly.

In another embodiment, an end effector calibration assembly includes an electronic controller, a robotic arm communicatively coupled to the electronic controller, a robot end effector coupled to an end of the robotic arm, a first camera assembly communicatively coupled to the electronic controller, and a second camera assembly communicatively coupled to the electronic controller. A first image capture path of the first camera assembly intersects a second image capture path of the second camera assembly. The electronic controller moves the robotic arm such that the robot end effector is positioned within the first image capture path and the second image capture path, receives image data from the first camera assembly, receives image data from the second camera assembly, and calibrates a position of the robot end effector based on the image data received from the first camera assembly and the second camera assembly.

In yet another embodiment, a method for calibrating a position of a robot end effector includes positioning the robot end effector simultaneously within a first image capture path of a first camera assembly and a second image capture path of a second camera assembly; and calibrating a positioning of the robot end effector based on image data received from the first camera assembly and the second camera assembly.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 10 depicts a flow chart illustrating a method for calibrating a robot end effector, according to one or more embodiments shown and described herein;

DETAILED DESCRIPTION

Embodiments of the present disclosure are directed to end effector calibration assemblies, systems, and methods. For example, an end effector calibration system may include, though is not limited to, a first camera assembly and a second camera assembly, wherein a first image capture path of the first camera assembly intersects a second image capture path of a second camera assembly. Image data received from the first and second camera assemblies may allow an electronic controller to quickly and effectively calibrate a position of the robot end effector, and specifically, the tip of the robot end effector. In some cases, the electronic controller may also recognize the type of tool and adjust calibration calculations accordingly. Moreover, in some cases, the electronic controller may be configured to process image data to determine wear on the end effector, that the robot end effector is properly assembly to the robotic arm, or other characteristics of the robot end effector. These and additional features will be discussed in greater detail below.

Figure 1:
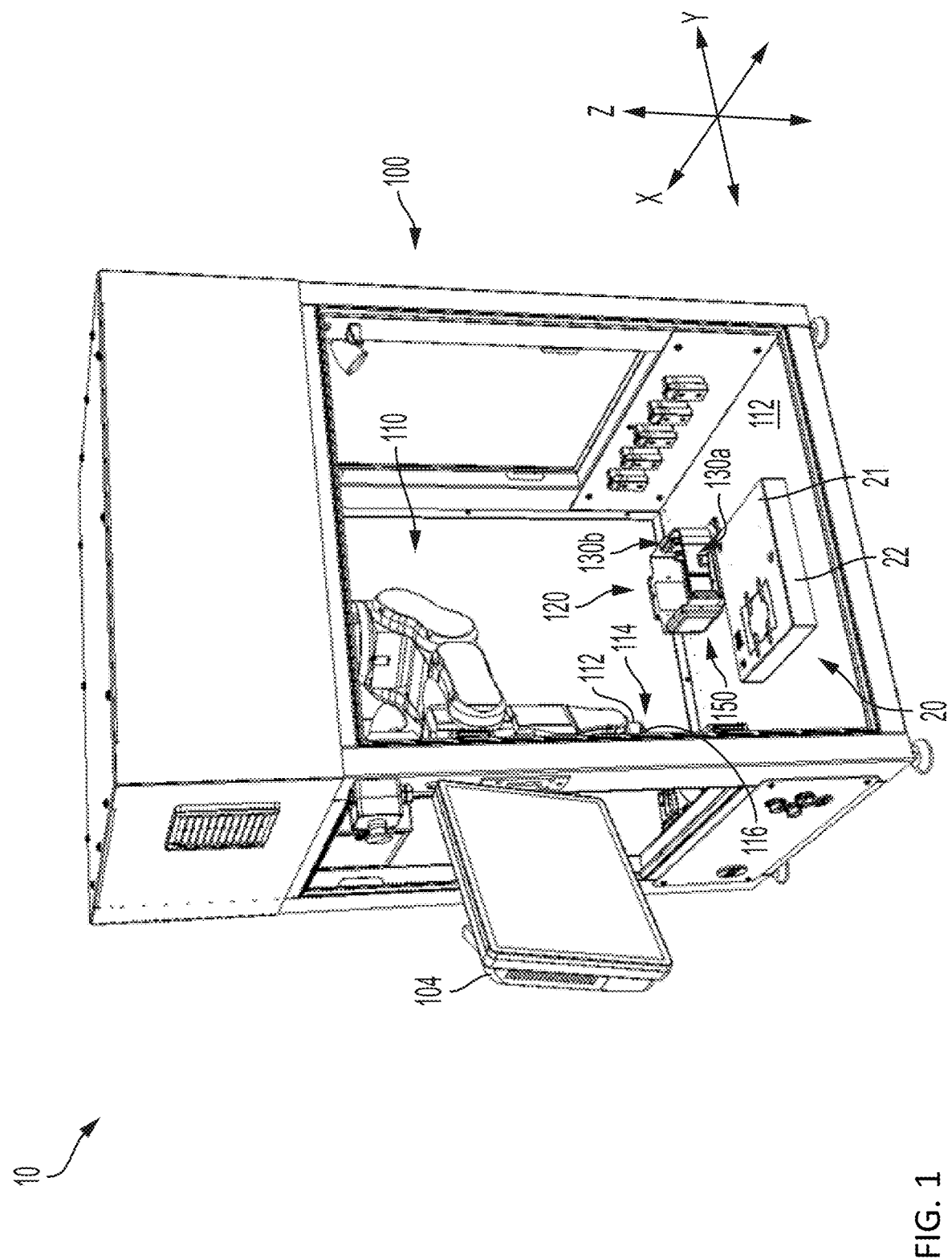
FIG. 1 depicts an end effector calibration system, according to one or more embodiments shown and described herein.

Referring now to FIG. 1, an end effector calibration system 100 is generally depicted. In FIG. 1, the end effector calibration system 100 is illustrated as being incorporated into a 3-D printer 10 such as, for example a BioAssemblyBot®, as produced by Advanced Solutions Life Sciences, located in Louisville, Ky. However, it is noted that end effector calibration systems may be used with any robotic assembly utilizing robot end effectors. For example, robotic welding systems, robotic pick and place systems, robotic surgery systems, and the like. The end effector calibration system 100 generally includes an electronic controller 104, a robotic arm 110, and an end effector calibration assembly 120. As will be described in greater detail herein the electronic controller 104 may control the robotic arm 110 to place a robot end effector 114 within the end effector calibration assembly 120, to calibrate a position of the robot end effector 114.

Figure 11B:
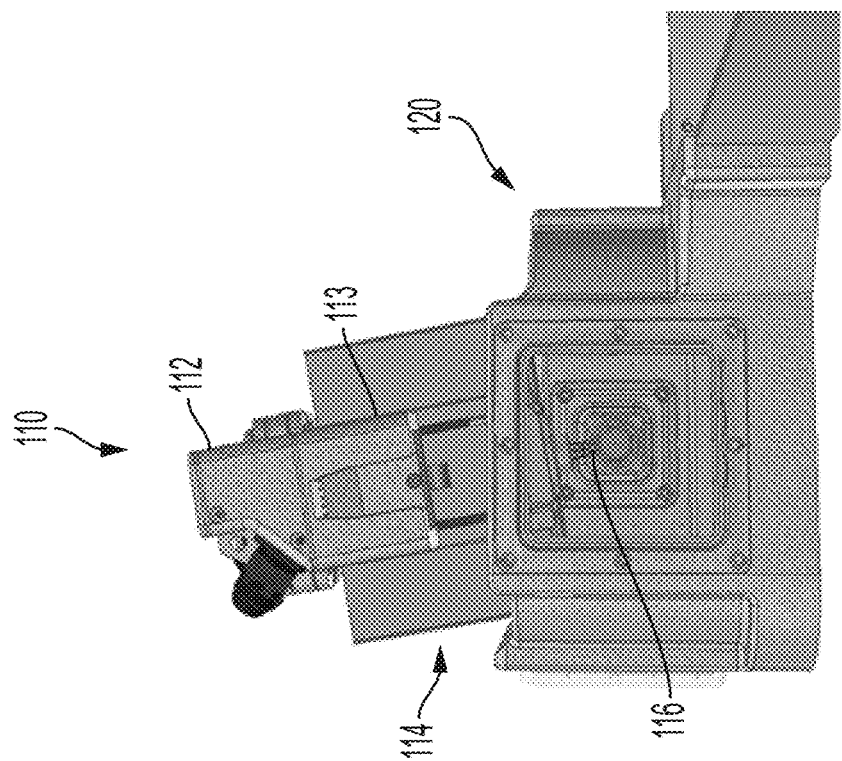
FIG. 11B illustrates a side view FIG. 11A, according to one or more embodiments shown and described herein.
Figure 11A:
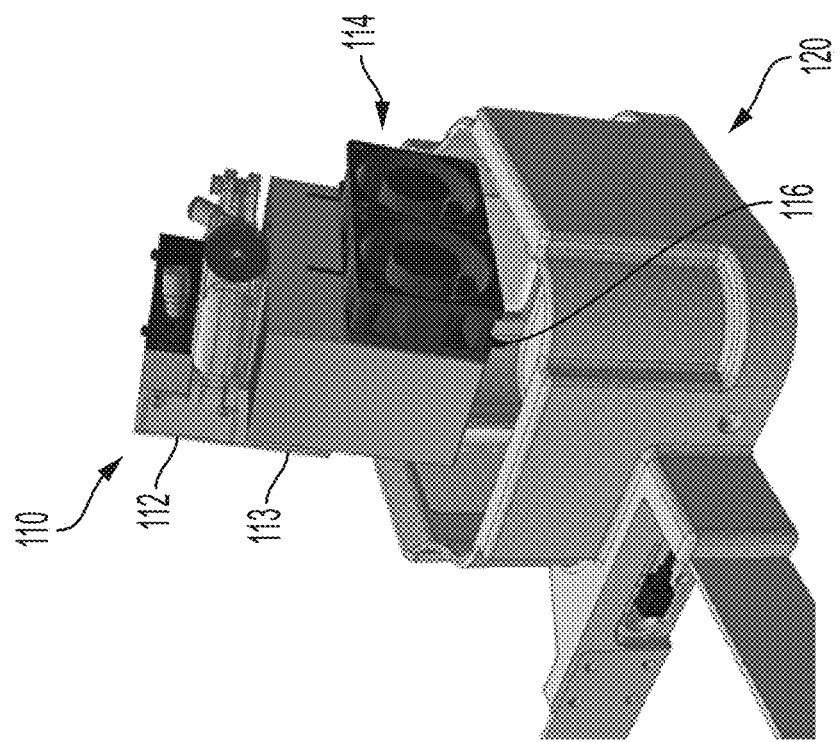
FIG. 11A illustrates a perspective view of a tip of an end effector placed within the end effector calibration system of FIG. 1, according to one or more embodiments shown and described herein.

The robotic arm 110 may be configured for various motions along a preprogrammed robot coordinate system. For example, the robotic arm 110 may be configured for 5-Axis, 6-Axis motion, 7-Axis motion, or more. The robotic arm 110 may be configured to have a robot end effector 114 attached thereto. For example, a robot end effector 114 may be coupled at a distal end 112 of the robotic arm 110. Referring briefly to FIGS. 11A, 11B an end 112 of the robotic arm 110 is generally depicted with a robot end effector 114 attached thereto. For example the robotic arm 110 may include a robotic manipulator 113 to which the end effector is attached. The robotic manipulator 113 has a tool center point (TCP) which is known/calculated (e.g., by the electronic controller 104) for the various positions in which the robotic arm 110 may move. While a tip 116 of an end effector may be aligned within the TCP, in most cases, the tip 116 of the end effector is offset by some degree, accordingly, the location of the tip 116 of the end effector must be calibrated to determine proper positioning of the end effector with the robotic arm 110 to perform various tasks (e.g., 3-D printing, cutting, pick and place operations, welding, etc.) The end effector calibration system 100 as described herein is directed to and solves this problem.

Figure 2:
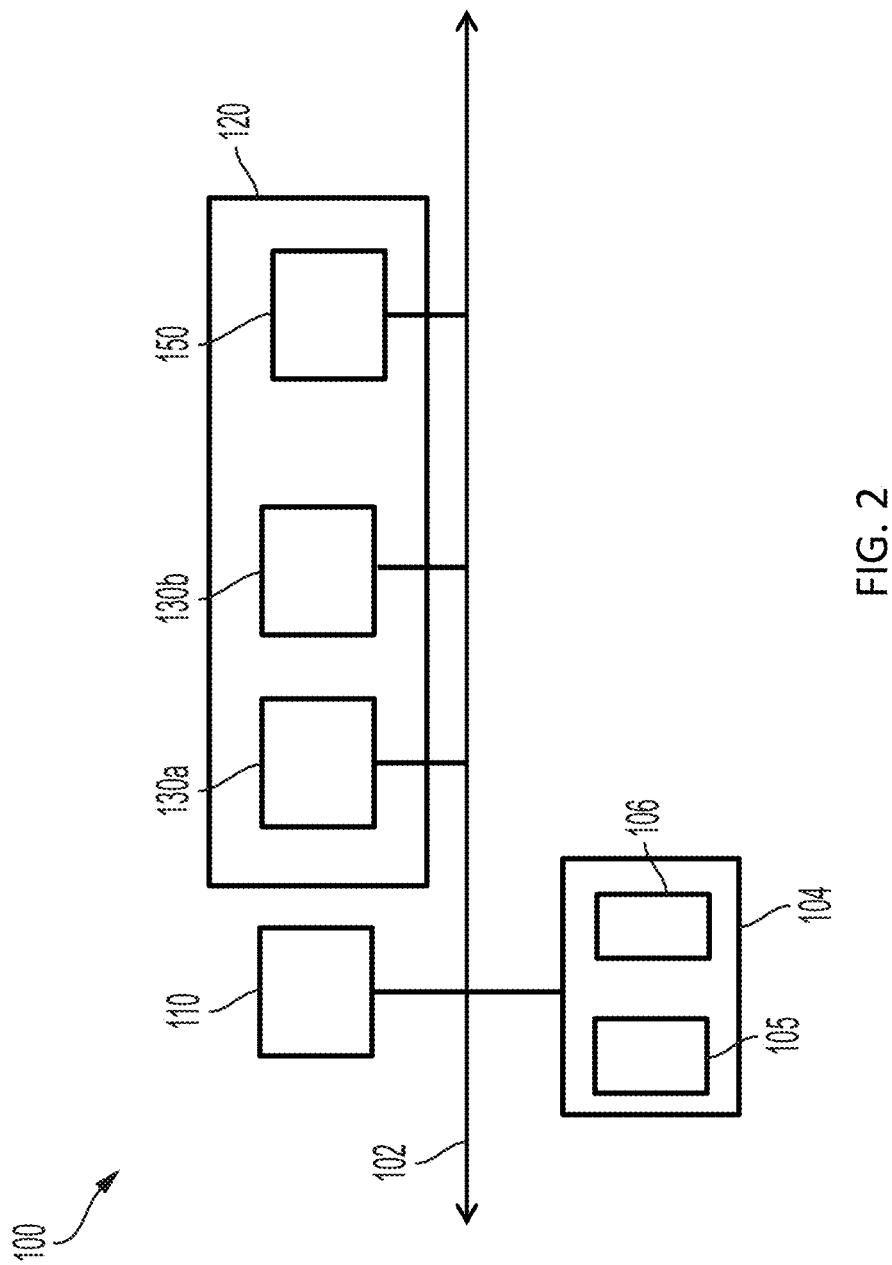
FIG. 2 schematically illustrates the end effector calibration system of FIG. 1, according to one or more embodiments shown and described herein.

FIG. 2 schematically illustrates the end effector calibration system 100 including the electronic controller 104, the robotic arm 110, and the end effector calibration assembly 120. In the depiction of FIG. 2, communication between the various components of the end effector calibration system 100 may be provided over a communication path 102.

The electronic controller 104 may include a processor 105 and a memory 106. The processor 105 may include any device capable of executing machine-readable instructions stored on a non-transitory computer readable medium. Accordingly, the processor 105 may include a controller, an integrated circuit, a microchip, a computer, and/or any other computing device. The memory 106 is communicatively coupled to the processor 105 over the communication path 102. The memory 106 may be configured as volatile and/or nonvolatile memory and, as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the end effector calibration system 100 and/or external to the end effector calibration system 100. The memory 106 may be configured to store one or more pieces of logic to control the various components of the end effector calibration system 100. The embodiments described herein may utilize a distributed computing arrangement to perform any portion of the logic described herein.

Accordingly, the electronic controller 104 may be any computing device including but not limited to a desktop computer, a laptop computer, a tablet, etc. The electronic controller 104 may be communicatively coupled to the other components of the end effector calibration system 100 over the communication path 102 that provides signal interconnectivity between the various components of the end effector calibration system 100. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 102 may be formed from any medium that is capable of transmitting a signal such as, for example, conductive wires, conductive traces, optical waveguides, or the like. In some embodiments, the communication path 102 may facilitate the transmission of wireless signals, such as WiFi, Bluetooth, and the like. Moreover, the communication path 102 may be formed from a combination of mediums capable of transmitting signals. In one embodiment, the communication path 102 comprises a combination of conductive traces, conductive wires, connectors, and buses that cooperate to permit the transmission of electrical data signals to components such as processors, memories, sensors, input devices, output devices, and communication devices. Accordingly, the communication path 102 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

As will be explained in greater detail herein, the electronic controller 104 may control operations of the robotic arm 110 and the end effector calibration assembly 120 to calibrate a location of a robot end effector (e.g., a tip of the robot end effector) such that precise control over movement of the robot end effector can be achieved. To calibrate a position of a robot end effector, the end effector calibration assembly 120 includes first camera assembly 130a and a second camera assembly 130b. The first camera assembly 130a and the second camera assembly 130b are communicatively coupled to the electronic controller 104 over the communication path 102. However, it is contemplated that the end effector calibration assembly 120 may include a greater number of camera assemblies. For example, the end effector calibration assembly may include a third camera assembly. Additionally, the end effector calibration assembly 120 may further include one or more backlight assemblies 150. In some cases, the one or more backlight assemblies 150 may be communicatively coupled to the electronic controller 104 such that the electronic controller 104 can execute logic to operate the one or more backlight assemblies 150, for example, during calibration procedures.

Referring again to FIG. 1, the end effector calibration assembly 120 is illustrated as incorporated with a 3D printer 10. In the illustrated embodiment, the end effector calibration assembly 120 is positioned adjacent to a print stage 20. The print stage 20 is illustrated as an elevated platform 21 having a skirt 22 extending around a perimeter of the elevated platform 21 between the elevated platform 21 and a base surface 12 of the 3D printer 10. However, as noted above, the end effector calibration assembly 120 may be incorporated into other robotic systems. Accordingly, the end effector calibration assembly 120 may be positioned anywhere a robotic arm having a robot end effector attached thereto can insert the robot end effector into the end effector calibration assembly 120 to calibrate a position of the robot end effector. For example, the end effector calibration assembly 120 may be embedded within the print stage 20.

Figure 3:
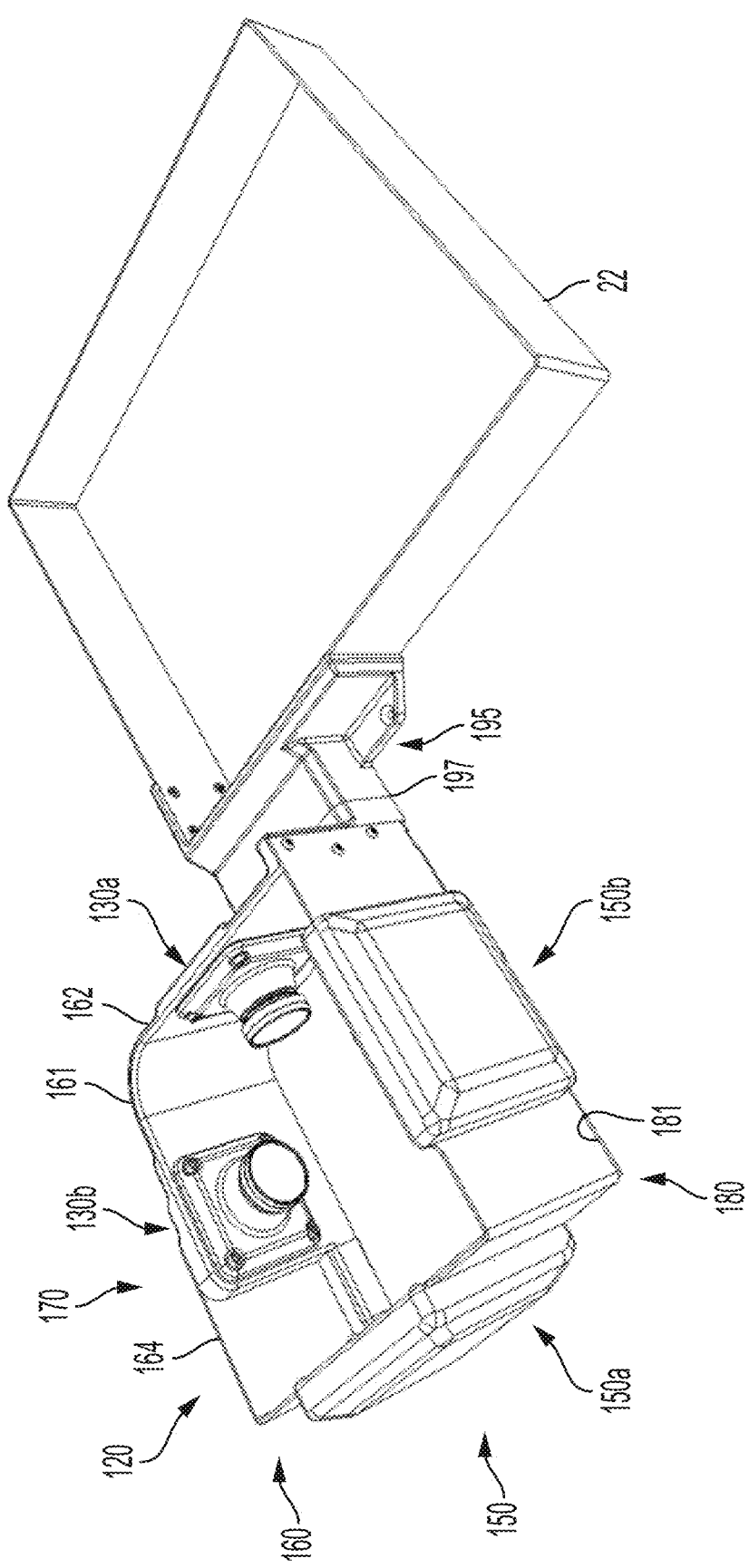
FIG. 3 depicts a perspective view of an end effector calibration assembly, according to one or more embodiments shown and described herein.

FIG. 3 illustrates a perspective view of the end effector calibration assembly 120 attached to the skirt 22 of the print stage 20 in isolation. The end effector calibration assembly 120 may include a housing 160 that provides structural support for the various components of the end effector calibration assembly 120. For example, the housing 160 may support the first camera assembly 130a, the second camera assembly 130b, and the one or more backlight assemblies 150. For example, the housing 160 may include a first side wall 162 and a second side wall 164 coupled to the first side wall 162. The first camera assembly 130a may be mounted to the first side wall 162 and the second camera assembly 130b may be mounted to the second side wall 164 to position the second camera assembly 130b relative to the first camera assembly 130a. The first and second camera assemblies 130a, 130b may be mounted to align with the preprogrammed robot coordinate system (e.g., X-Y Coordinate system) such as displayed in FIGS. 1 and 2. For example, the first camera assembly 130a may be aligned with the Y-axis of the robot coordinate system and the second camera assembly 130b by be aligned with the X-axis of the robot coordinate system. While the housing 160 is generally described as including a square or rectangular shape, it is contemplated that the housing 160 may have a cylindrical shape such that the first sidewall and the second sidewall are curved and may smoothly transition from one to the other.

Figure 4:
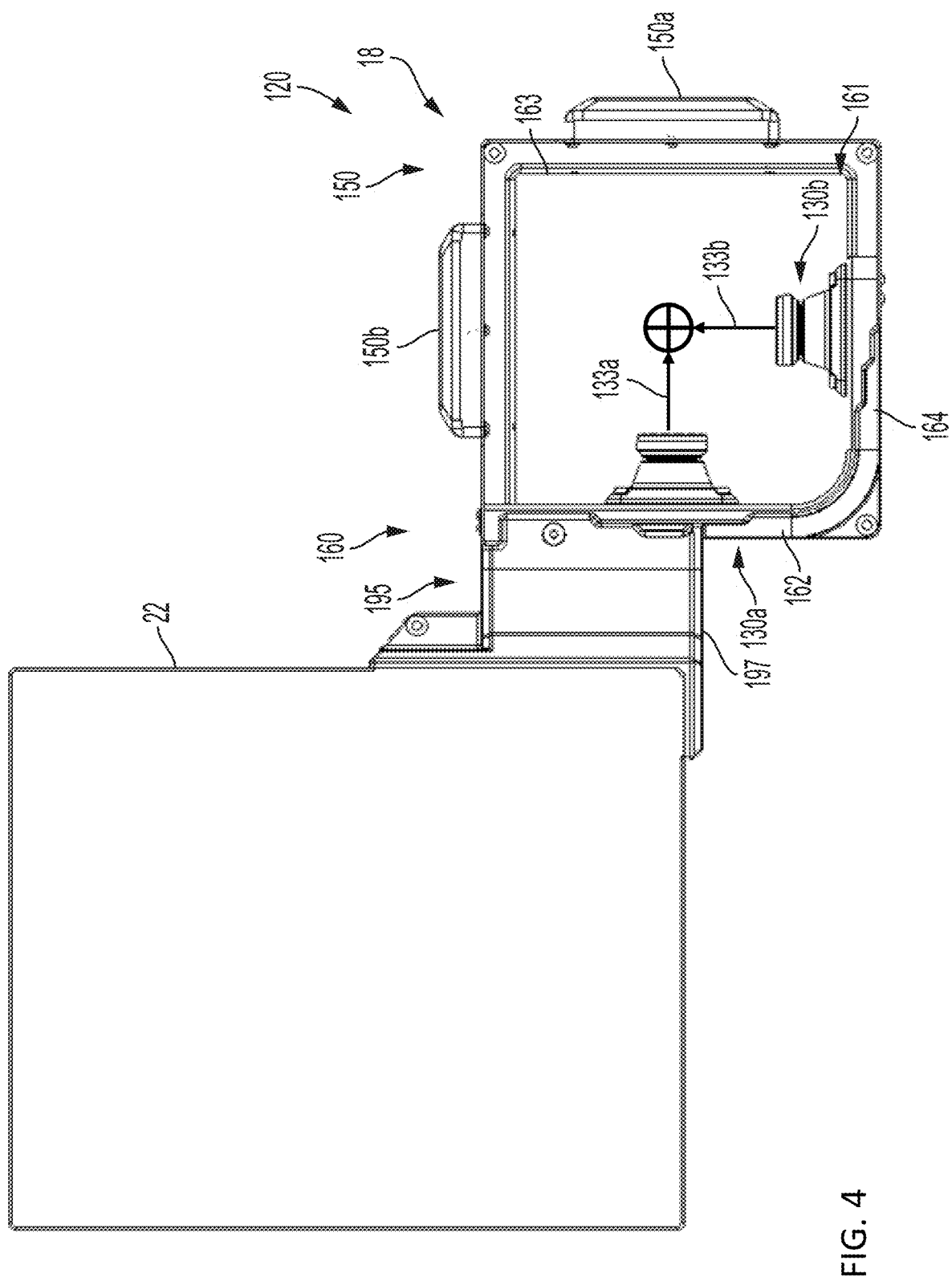
FIG. 4 depicts a top view of the end effector assembly of FIG. 3, according to one or more embodiments shown and described herein.

FIG. 4 illustrates a top view of the end effector calibration assembly 120. In the illustrated embodiment, the first camera assembly 130a has a first image capture path 133a and the second camera assembly 130b has a second image capture path 133b. The first image capture path 133a of the first camera assembly 130a intersects the second image capture path 133b of the second camera assembly 130b. For example, the first image capture path 133a may be directed to orthogonally intersect the second image capture path 133b. To orient the first image capture path 133a orthogonal to the second image capture path 133b, the first camera assembly 130a may be mounted to the first side wall 162 of the housing 160 and the second camera assembly 130b may be mounted to the second side wall 164 such that the second camera assembly 130b is positioned orthogonal to the first camera assembly 130a.

Figure 5:
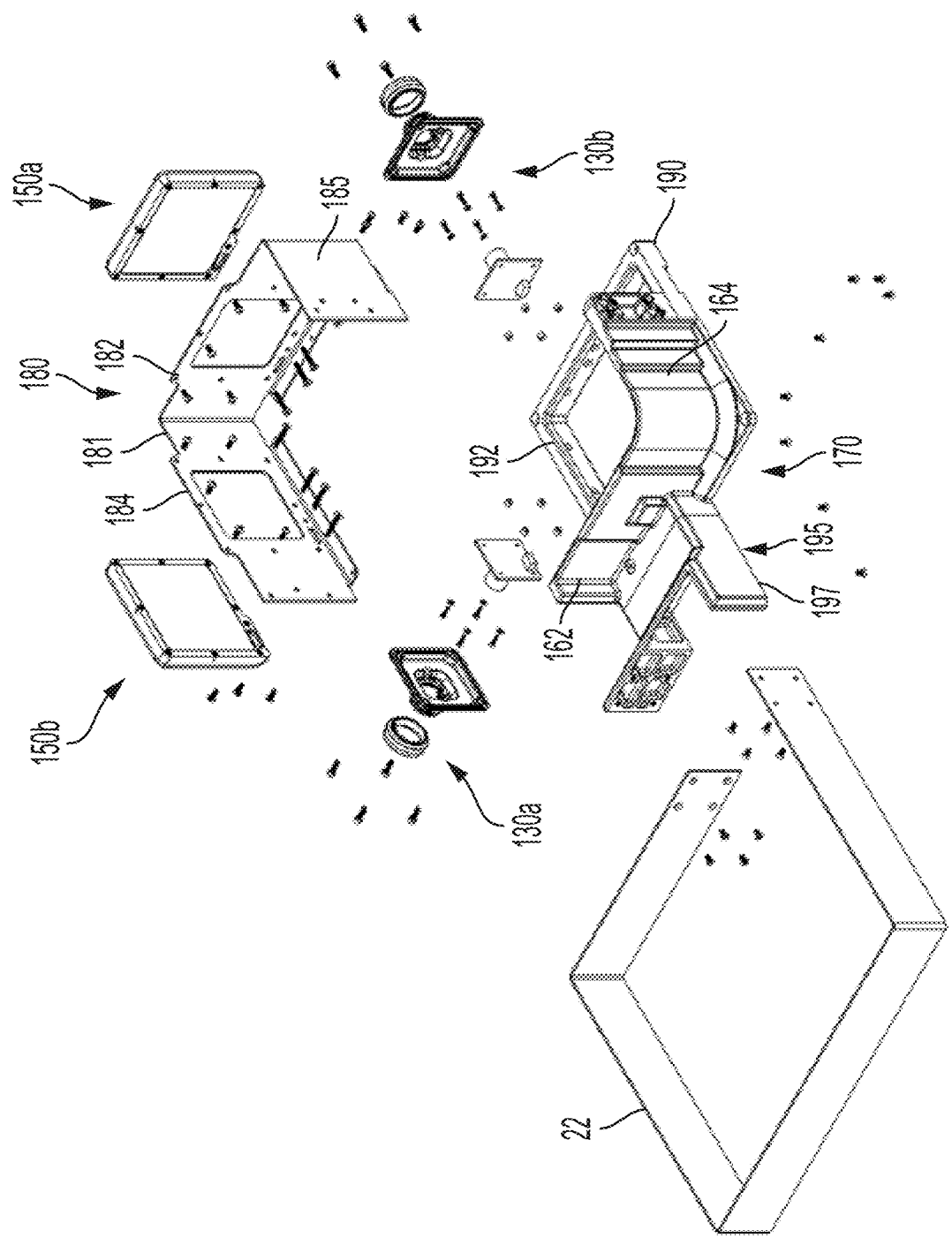
FIG. 5 depicts an exploded view of the end effector assembly of FIG. 3, according to one or more embodiments shown and described herein.

FIG. 5 illustrates an exploded view of the end effector calibration assembly 120. In the illustrated embodiment, the housing 160 includes a primary housing portion 170, a backlight housing portion 180, and a base wire housing portion 190. When assembled together, as illustrated in FIGS. 3 and 4, the housing 160 forms an enclosure 161 having an opening 163 configured to receive a robot end effector therethrough. The various components may couple to one another through any convention couple techniques such as through the use of fasteners (e.g., threaded fasteners, bushings, etc.). In some embodiments, various components may be fixed relative to one another via welding, brazing, or the like. As is noted above, while the housing 160 is shown as generally having a square or rectangular configuration, the various components of the housing may instead for may circular or cylindrical shape. Accordingly, the enclosure may include any polygonal or non-polygonal shapes (e.g., circular, square, rectangular, etc.).

The primary housing portion 170 includes the first side wall 162 and the second side wall 164. The first side wall 162 and the second side wall 164 may include electrical connections formed to interface with and electrically and communicatively couple the first camera assembly 130a and the second camera assembly 130b to the control unit, illustrated in FIG. 2. For example, the first and second camera assemblies 130a, 130b may include electrical connections such as USB's and the first and second side walls may include receiving ports that the first and second camera assemblies 130a, 130b may plug into. Camera assemblies are described in greater detail below in regards to FIGS. 7A-7C. It is noted that camera assemblies may be readily interchanged with camera assemblies having, for example, more pixels, greater zoom, etc. Accordingly, camera assemblies may be modular units that may easily connect or disconnect to the primary housing portion 170 to provide ready interchangeability.

The backlight housing portion 180 may provide structural support for the one or more backlight assemblies 150. For example, the backlight housing portion 180 may include a wall 181 that may couple to both the first side wall 162 and the second sidewall of the primary housing portion 170 to form the enclosure 161. For example, the wall 181 may include a first wall portion 182 and a second wall portion 184 angled with respect to the first wall portion 182. For example, the second wall portion 184 may be positioned orthogonal to the second wall portion 184. A connecting wall portion 185 may extend from the first wall portion 182 to be coupled to the second side wall 164 of the primary housing portion 170. The connecting wall portion 185 may be angled with respect to the first wall portion 182. For example, the connecting wall portion 185 may extend orthogonally from the first wall portion 182 and parallel to the second wall portion 184 as illustrated in FIG. 5.

The one or more backlight assemblies 150 may be mounted on the backlight housing portion 180 and directed toward the first and second camera assemblies 130a, 130b. The one or more backlight assemblies 150 may be positioned to direct light into at least one of the first image capture path 133a and the second image capture path 133b. For example, a first backlight assembly 150a may be positioned in opposition to the first camera assembly 130a so as to direct a first light along the first image capture path 133a. Accordingly, the first backlight assembly 150a may be coupled to the first wall portion 182 of the backlight housing portion 180. Similarly, a second backlight assembly 150b may be positioned in opposition to the second camera assembly 130b so as to direct a second light along the second image capture path 133b. For example, the second backlight 150b may be coupled to the second wall portion 182 of the backlight housing portion 180. Accordingly, when the robot end effector is placed within the enclosure defined by the housing 160, image data captured by the first and second camera assemblies 130a, 130b may be backlit. It is contemplated that in some embodiments, a single backlight assembly (e.g., a solid sheet of flexible LED array), may encapsulate the full field of view of all camera assemblies included in the end effector calibration assembly 120 instead of dedicated backlights for each camera assembly. Similar to the camera 140 assemblies, the one or more backlight assemblies 150 may be easily replaceable with more powerful, focused, or colored backlights. Accordingly, the one or more backlight assemblies 150 may be modular units that may easily connect or disconnect to the backlight housing portion 180 to provide ready interchangeability.

In some embodiments, it is contemplated that, in addition to or in place of backlighting, foreground lighting may be provided. For example, a light source may be positioned proximate (e.g., next to) one or more of the camera assemblies to provide foreground lighting to a robot end effector being calibrated. As will be described in greater detail below as to the one or more backlights 150, both foreground lighting and/or backlighting may use multi-color lights (e.g., LEDs) to provide various lighting scenarios for particular robot end effectors. In various embodiments, the electronic controller may control individual backlight assemblies/foreground lights and/or zones within the various backlight assemblies/foreground lights to particularly control lighting effects within the end effector calibration assembly 100. Accordingly, better lighting control may provide for better image capture of a robot end effector positioned within the end effector calibration assembly 100.

The base wire housing portion 190 may connect to a base of the backlight housing portion 180 and provide a channel 192 through which wires from the one or more backlight assemblies 150 to be directed in to the primary housing portion 170. The base wire housing portion 190 may be coupled to the primary housing portion 170.

Wiring from the first and second camera assemblies 130a, 130b and the one or more backlight assemblies 150 may be routed to a power/data connector 195 coupled to the primary housing portion 170. The power/data connector 195 may couple the end effector calibration assembly 120 to the skirt 22 of the print stage 20, for example. The power/data connector 195 may include a connector housing 197 that may be coupled to the skirt 22 (e.g., using fasteners or similar mechanical coupling means). An opening in the skirt 22 may expose electrical/data ports 196 of the end effector calibration assembly 120 (e.g., electrical/data ports 196 for the first and second camera assemblies 130a, 130b and/or electrical/data ports 196 for the one or more backlight assemblies 150). The electrical/data ports 196 may allow for electrical power supply to the first and second camera assemblies 130a, 130b and the one or more backlight assemblies 150. The electrical/data ports 196 may also for part of the communication path 102 shown in FIG. 2, to allow for data interconnectivity between the electronic controller 104 and the first and second camera assemblies 130a, 130b and the one or more backlight assemblies 150.

Figure 6:
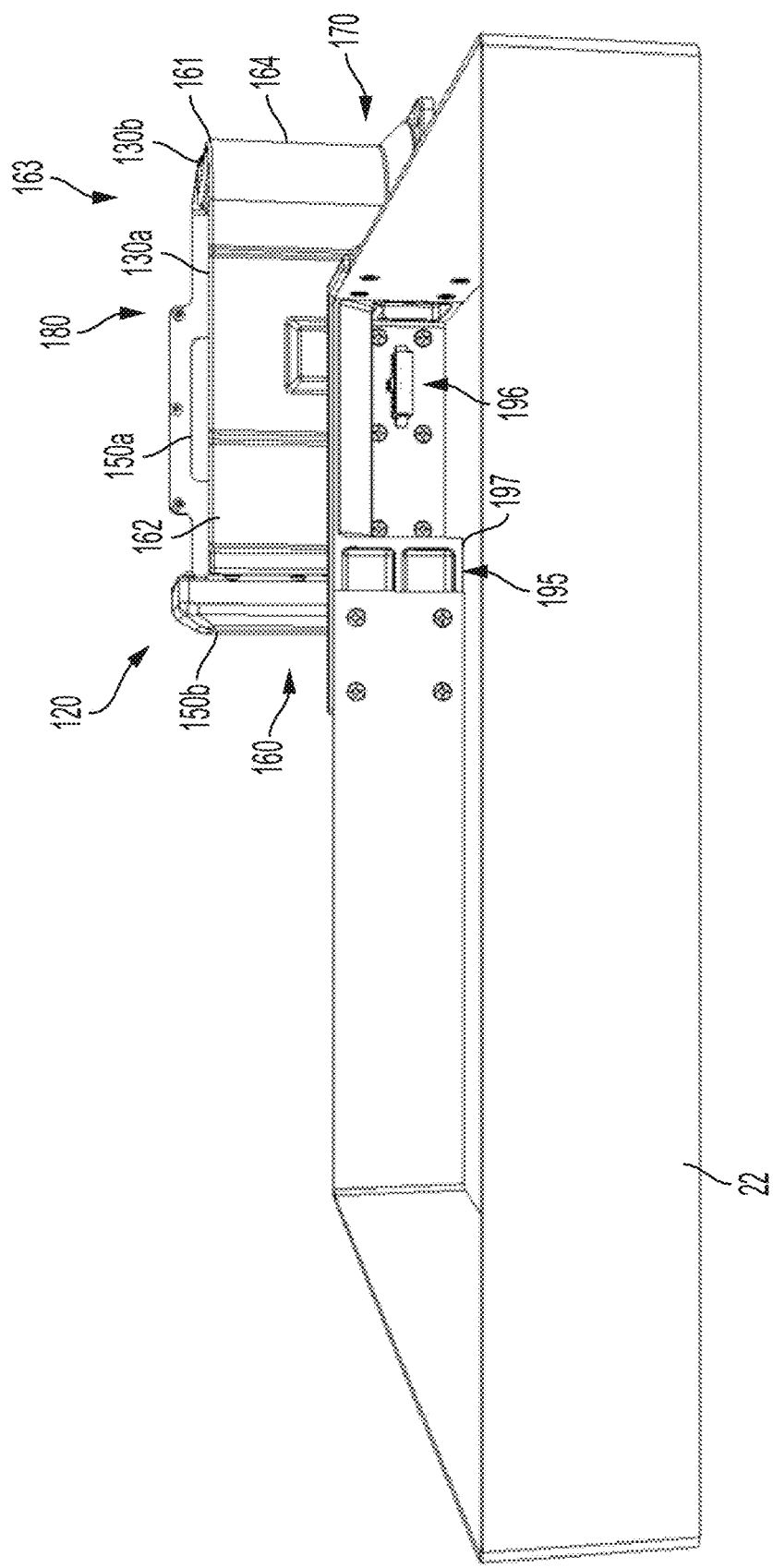
FIG. 6 depicts a front view of the end effector assembly of FIG. 3, according to one or more embodiments shown and described herein.

FIG. 6 illustrates a front view of the end effector calibration assembly 120 assembled to the skirt 22 of the print stage 20 with the power/data connector 195. An opening in the skirt 22 may expose the electrical/data ports 196 of the end effector calibration assembly 120. Wiring from the electronic controller 104 may be routed from the electrical/data ports 196 to provide communication between the electronic controller 104, illustrated in FIGS. 1 and 2, and the end effector calibration assembly 120.

Figure 7B:
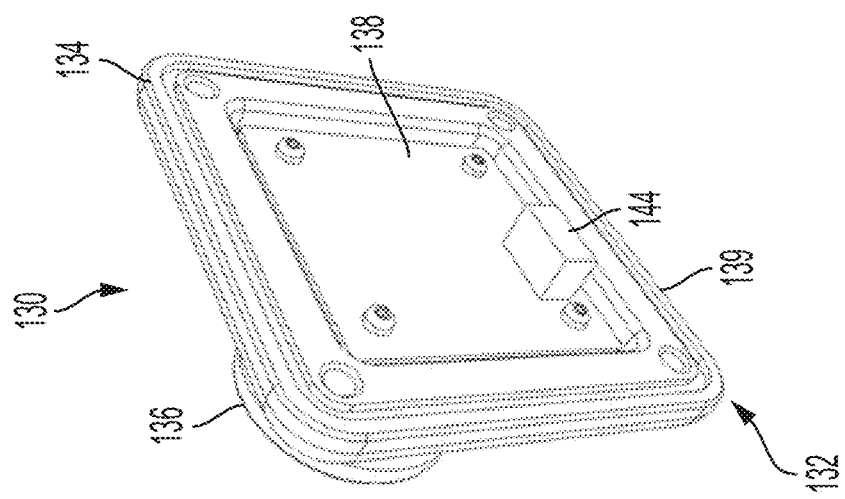
FIG. 7B depicts a rear perspective view of the camera assembly of FIG. 7A, according to one or more embodiments shown and described herein.
Figure 7A:
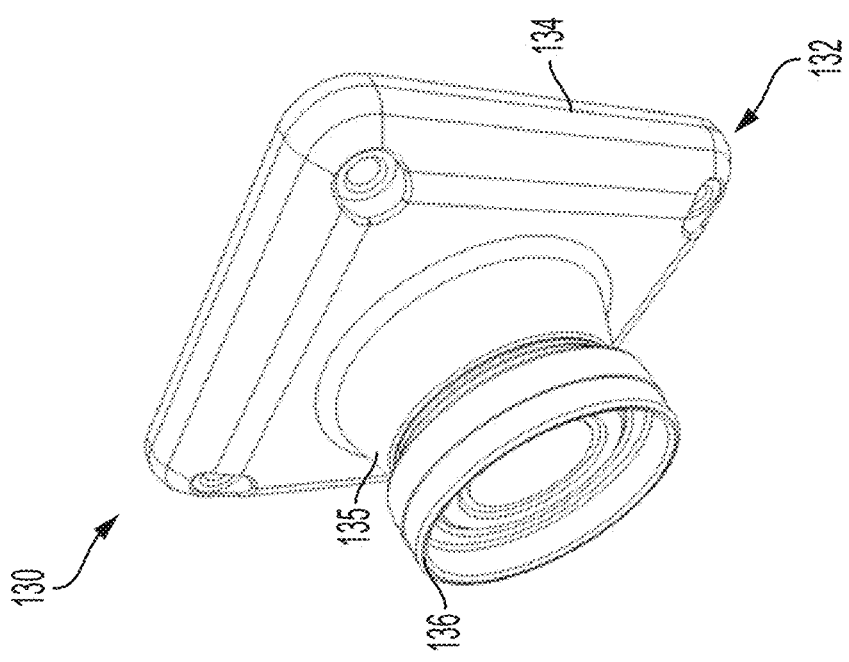
FIG. 7A depicts a front perspective view of a camera assembly in isolation, according to one or more embodiments shown and described herein.
Figure 7C:
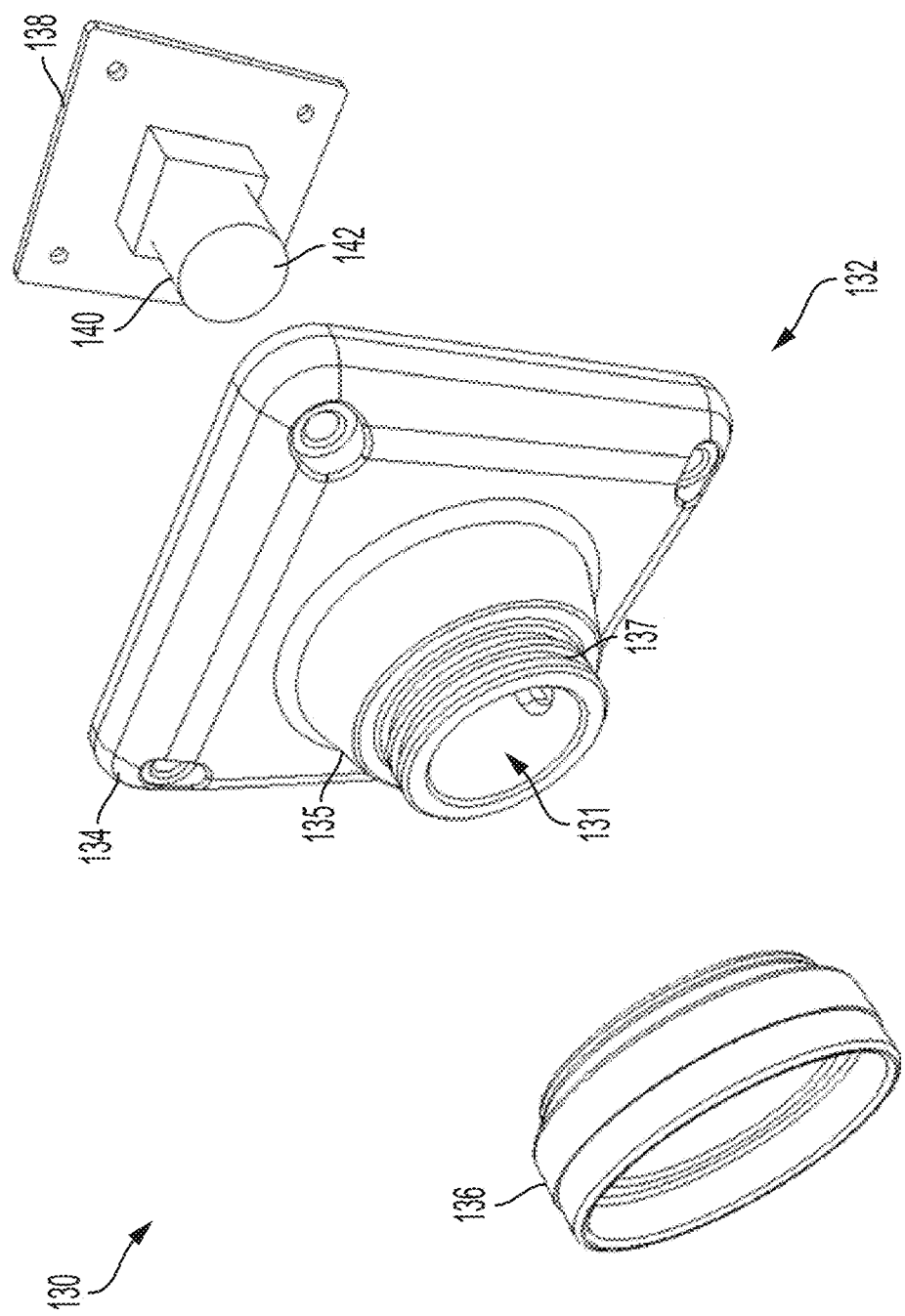
FIG. 7C depicts an exploded view of the camera assembly of FIG. 7A, according to one or more embodiments shown and described herein.

FIGS. 7A-7C illustrate a camera assembly 130 according to one or more embodiments. FIG. 7A illustrates a front perspective view, FIG. 7B illustrates a back perspective view, and FIG. 7C illustrates an exploded view of the camera assembly 130. Each of the first camera assembly 130a and the second camera assembly 130b may be substantially identical in structure to the camera assembly 130. However, variations of the camera assembly 130 are contemplated and possible.

Referring collectively to FIGS. 7A-7C, the camera assembly 130 may include a camera housing 132 configured to house electronic components of the camera assembly 130. The camera housing 132 may include a main body 134, a lens cover 136, and a back plate 138. A camera 140 (shown in FIG. 3C) is housed within the camera housing 132. The camera 140 may be any device having an array of sensing devices (e.g., pixels) capable of detecting radiation in an ultraviolet wavelength band, a visible light wavelength band, or an infrared wavelength band. The camera 140 may have any resolution. In some embodiments, one or more optical components, such as a mirror, fish-eye lens, or any other type of lens may be optically coupled to the camera 140.

Referring to FIG. 7C, the main body 134 of the camera housing 132 may define a cavity 131 within which the camera 140 sits. For example, in the illustrated embodiment, the main body 134 includes a projecting portion 135 within which the camera 140 may extend. Accordingly, when inserted into the main body 134 of the housing 160, a lens 142 of the camera 140 may sit within the projecting portion 135 so as to capture image data of a plane parallel to the lens 142 of the 142 of the camera 140.

The camera housing 132 may provide a waterproof environment in which the camera 140 may operate. For example, the lens cover 136 may protect the camera 140 from inadvertent splashes of fluid toward the camera 140. The lens cover 136 may be coupled to the projecting portion 135 of the main body 134 through, for example, a threaded engagement. The lens cover 136 may provide a window (e.g., transparent glass, plastic, or the like) through which the lens 142 of the camera 140 can capture image data. In some embodiments, the projecting portion 135 may include an 0-ring groove 137, such that an O-ring may be positioned to provide a fluid seal between the lens cover 136 and the main body 134.

Still referring to FIG. 7C, the camera 140 may be mounted to the back plate 138. For example, the camera 140 may be mounted to the back plate 138 using adhesives, fasteners, or other conventional coupling techniques. Referring to FIG. 7B, the camera 140 may include an electrical connection 144 (e.g., USB, GIGe, or Ethernet based) that extends through the back plate 138. The electrical connection 144 may allow for connection and communication with the communication path 102 illustrated in FIG. 2. The back plate 138 may be coupled to the main body 134 through fasteners or the like. A second O-ring groove 139 may be formed between the back plate 138 and the main body 134, into which an O-ring may be inserted. The O-ring may provide a fluid seal between the back plate 138 and the main body 134. It is noted that while the camera housing 132 is illustrated as having a particular shape, other shapes are contemplated and possible without departing from the scope of the present disclosure.

Figure 8B:
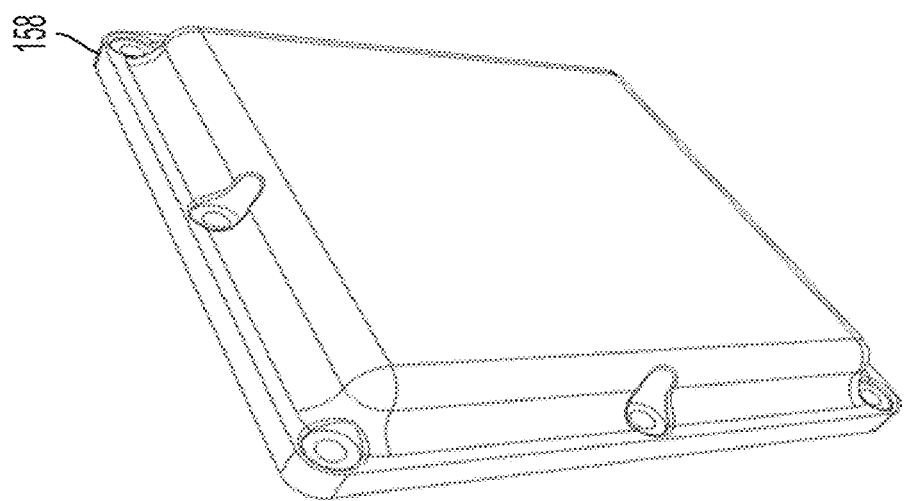
FIG. 8B depicts a rear perspective view of the backlight assembly of FIG. 8A, according to one or more embodiments shown and described herein.
Figure 8A:
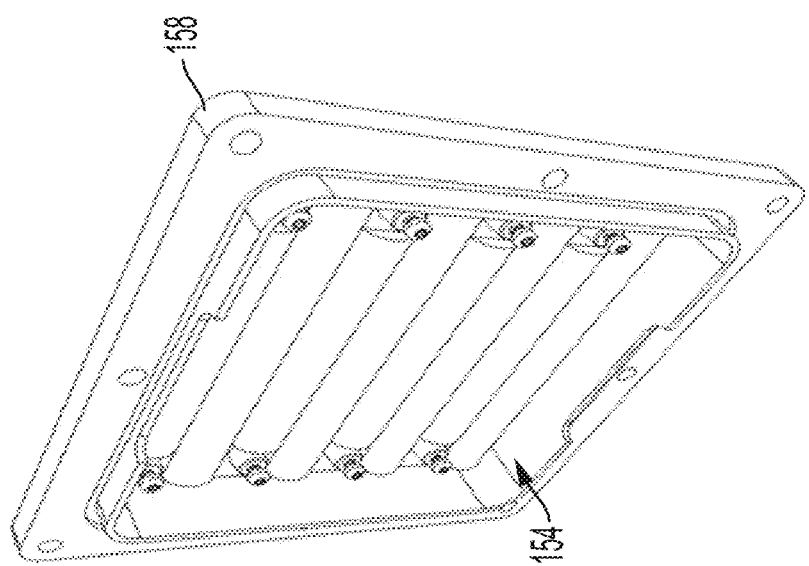
FIG. 8A depicts a front perspective view of a backlight assembly in isolation, according to one or more embodiments shown and described herein.
Figure 8C:
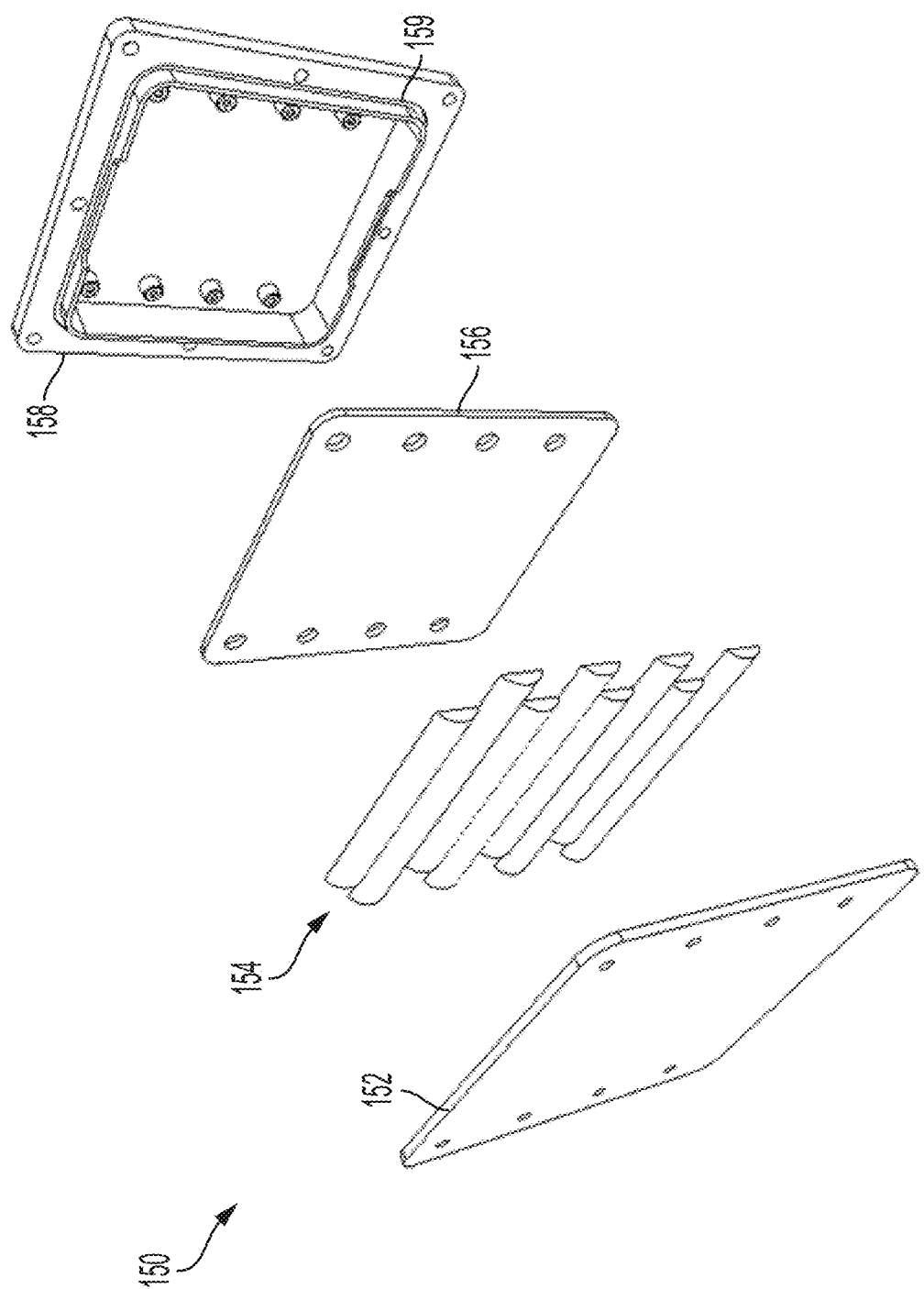
FIG. 8C depicts an exploded view of the backlight assembly of FIG. 8A, according to one or more embodiments shown and described herein.

FIGS. 8A-8C illustrate various views of a backlight assembly 150. The backlight assembly 150 may be identical to the first and second backlight assemblies 150a, 150b noted above. FIG. 8A illustrates a front perspective view, FIG. 8B illustrates a back perspective view, and FIG. 8C illustrates an exploded review. Referring specifically to FIG. 8C, the backlight assembly 150 may include a light diffuser 152, a light source 154, a backing plate 156, and backlight housing 158. In some embodiments, the backlight assembly 150 may include a trim potentiometer communicatively coupled to the light source 154 for dimming the light source 154.

The light diffuser 152 may be any material which diffuses or scatters light such that light from the light source 154 is not concentrated at the specific point of the light source 154. In some embodiments, the light diffuser 152 may be opaque.

Behind the light diffuser 152 may be the light source 154. The light source 154 may be any device that outputs visible light. In some embodiments, the light source 154 may be an array of light sources (e.g., an LED array). The light source 154 may include any color light source. In some embodiments, the light source 154 may be a color that is particularly chosen in regards to the sensitivity of the first and second camera assemblies 130a, 130b. For example, the first and second camera assemblies 130a, 130b may be sensitive toward blue light to avoid white ambient lighting interfering with the image capture of the first and second camera assemblies 130a, 130b. In some embodiments, a light source 154 (e.g., a while light source) of the first backlight assembly 150a may be different from the light source 154 (e.g., a red light source) of the second backlight assembly 150b.

The backing plate 156 may supply structural support for the light source 154. In some embodiments, the backing plate 156 may be reflective to enhance light output by the backlight assembly 150.

The backlight housing 158 may provide structural support for the various components of the backlight assembly 150 and may be coupled to the backlight housing portion 180 of the end effector calibration assembly 120. For example, the backlight housing 158 may couple to the backlight housing portion 180 using threaded fasteners, adhesives, or the like. The backlight housing 158 may define an O-Ring groove 159 for insertion of an O-Ring to provide a water tight seal around the backlight assembly 150.

Figure 9B:
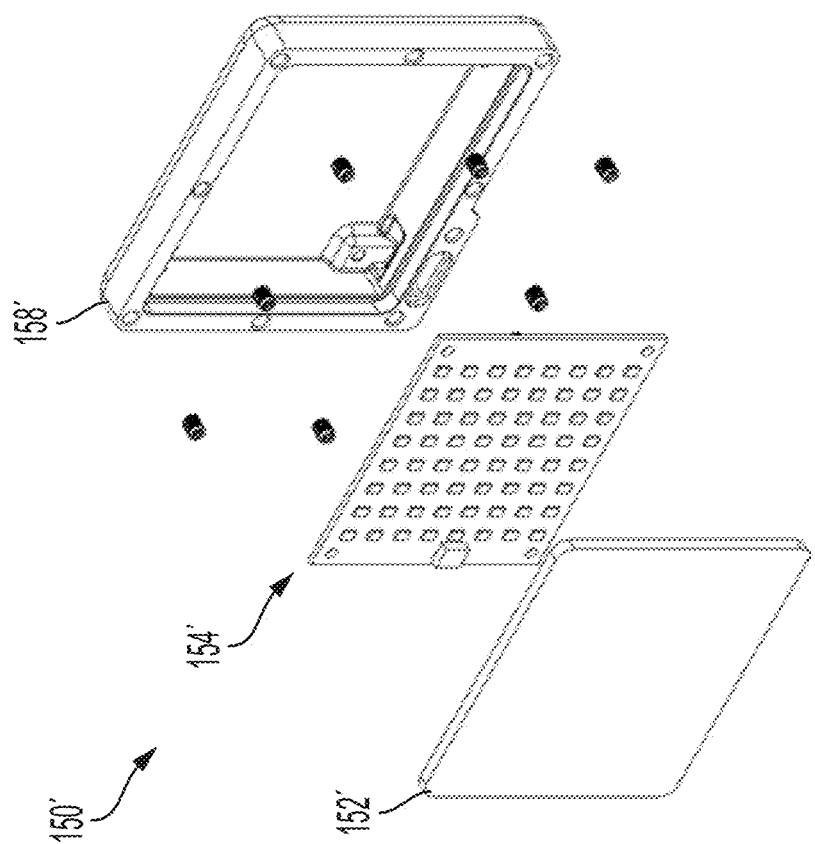
FIG. 9B depicts an exploded view of the backlight assembly of FIG. 9A, according to one or more embodiments shown and described herein.
Figure 9A:
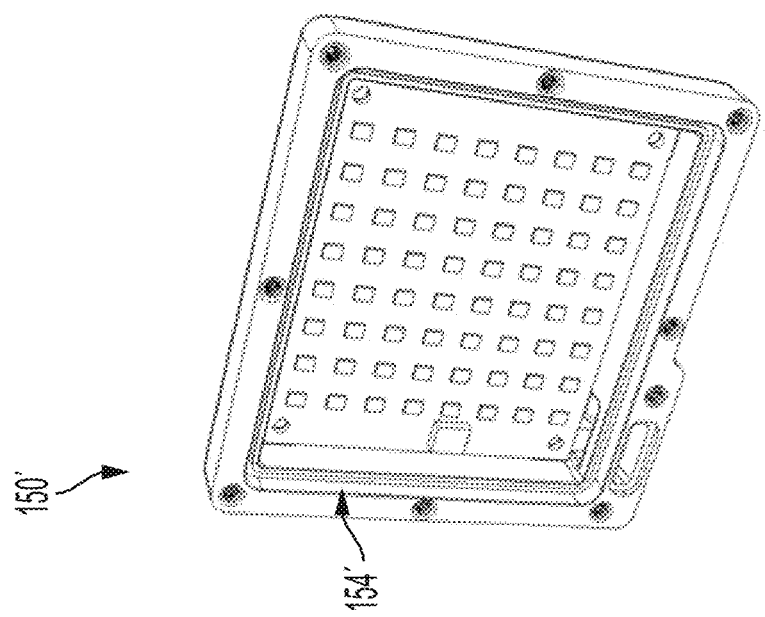
FIG. 9A depicts a front perspective view of a backlight assembly in isolation, according to one or more embodiments shown and described herein.

FIG. 9A and 9B illustrate an alternative backlight assembly 150'. FIG. 9A illustrates a front perspective view and FIG. 9B illustrates an exploded view. In the illustrated embodiment, the backlight assembly 150' includes a light diffuser 152' (similar to light diffuser 152), PCB LED Array 154' in place of light source 154, and backlight housing 158' (similar to back light housing 158). Accordingly, the PCB LED Array 154' may provide a more uniform backlight.

Figure 12B:
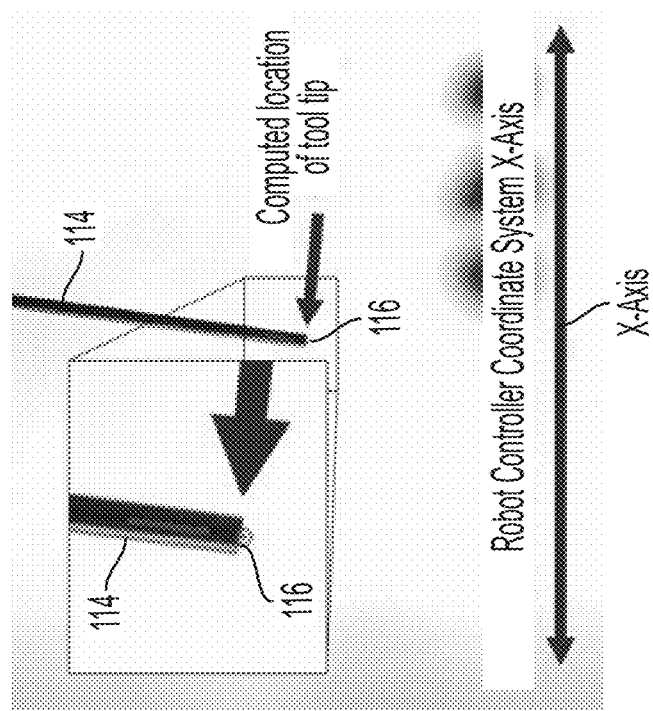
FIG. 12B depicts image data for calibrating a robot end effector from a second camera assembly, according to one or more embodiments shown and described herein.
Figure 12A:
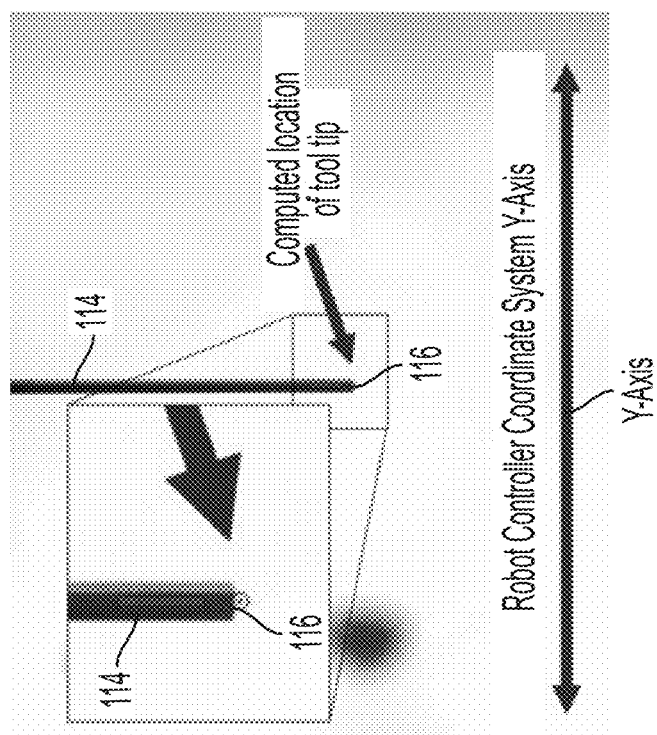
FIG. 12A depicts image data for calibrating a robot end effector from a first camera assembly, according to one or more embodiments shown and described herein.

FIG. 10 illustrates a flowchart 200 depicting a method for calibrating the position of a robot end effector 114 coupled to a robotic arm 110. Though steps are shown in a particular order or with a particular number of steps, a greater or fewer number of steps in varying orders are contemplated and possible without departing from the scope of the present disclosure. The method at step 202 includes positioning the robot end effector 114 simultaneously within the first image capture path 133a and the second image capture path 133b. When in position, the method may include capturing image data of the end effector with the first camera assembly 130a and the second camera assembly 130b. Further, in some embodiments, a step of backlighting the robot end effector with the one or more backlight assemblies 150, described above, may be included. Backlight may provide better contrast within the image of the robot end effector and the background. FIGS. 11A and 11B illustrate an robot end effector 114 coupled to the end 112 of the robotic arm 110. The tip 116 of the end effector 114 is placed within the enclosure defined by the end effector calibration assembly 120. At step 204 the method further includes calibrating a position of the robot end effector 114 based on image data received from the first camera assembly 130a and the second camera assembly 130b. In particular, a position of the tip 116 of the robot end effector 114 may be calibrated. FIGS. 12A and 12B illustrate image data captured from the first camera assembly 130a and the second camera assembly 130b, respectively.

To calibrate a position of the robot end effector 114 at step 206, the electronic controller 104 may process image data from the first camera assembly 130a to determine a position of the robot end effector 114 (e.g., the tip 116 of the robot end effector 114 using edge recognition processing) within a first plane perpendicular to the first image capture path 133a (e.g., along the Y-axis 6). At step 208, the electronic controller 104 may similarly process image data from the second camera assembly 130b to determine a second position of the robot end effector 114 (e.g., the tip 116 of the robot end effector 114) within a second plane perpendicular to the second image capture path 133b (e.g., along the X-axis). These positions may be recorded along with the TCP of the robotic manipulator 113, discussed above. This process may then be repeated several times (e.g., 1 or more iterations, 2 or more iterations, 4 or more iterations, 10 or more iterations, 20 or more iterations, 30 or more iterations, etc.) with different TCPs. That is the position of the robot end effector 114 may be adjusted within the first image capture path 133a and the second image capture path 133b (step 210), which results in a new TCP, which may be calculated and/or retrieved by the electronic controller 104. Accordingly, for each TCP iteration, the position of the end effector 114 within the first image capture path 133a and the second image capture path 133b is determined. After a predetermined number of iterations (e.g., 1 or more iterations, 2 or more iterations, 4 or more iterations, 10 or more iterations, 20 or more iterations, 30 or more iterations, etc.), a mathematical transformation may be determined by the electronic controller, such that when the transformation is applied to each TCP, the resulting location of the robot end effector 114 within the robot coordinate system may be determined. Accordingly, the electronic controller 104 may determine an equation to determine a precise location and orientation of the robot end effector 114 for any TCP.

In some embodiments, calibration of the robot end effector may automatically occur after installation of the new robot end effector. In some embodiments calibration may occur prior to any work to be performed by the robotic arm 110 and the robot end effector 114 to ensure proper positioning of the robot end effector 114 prior to operation.

In some embodiments, at step 212, the electronic controller 104 may process image data received from the first camera assembly 130a and the second camera assembly 130b to identify the particular end effector type. Accordingly, the electronic controller 104 may be able to determine particular features of the end effector type which may be helpful in determining specific tool properties. For example, the electronic controller 104 may identify the tool type and be able to determine wear on the tool, improper installation, tool length, tool shape, surface contaminates, etc.).

In embodiments, calibration may be substantially faster than traditional calibration techniques. For example, in some embodiments calibrations may be done in less than 30, less than 20, or less than 10 seconds to perform a six-dimensional tip calibration.

Embodiments can be described with reference to the following numbered clauses, with preferred features laid out in the dependent clauses:

1. An end effector calibration assembly, comprising: an electronic controller; a first camera assembly communicatively coupled to the electronic controller; and a second camera assembly communicatively coupled to the electronic controller, wherein a first image capture path of the first camera assembly intersects a second image capture path of the second camera assembly, wherein the electronic controller: receives image data from the first camera assembly; receives image data from the second camera assembly; and calibrates a position of a robot end effector based on the image data received from the first camera assembly and the second camera assembly.

2. The end effector calibration assembly of clause 1, wherein the first image capture path is directed to intersect the second image capture path orthogonally.

3. The end effector calibration assembly of clause 1, further comprising a housing comprising: a first side wall; and a second side wall coupled to the first side wall, wherein: the first camera assembly is mounted to the first side wall; and the second camera assembly is mounted to the second side wall and is positioned orthogonal to the first camera assembly.

4. The end effector calibration assembly of clause 3, wherein the housing comprises an enclosure having an opening configured to receive the robot end effector therethrough.

5. The end effector calibration assembly of clause 1, further comprising one or more backlight assemblies positioned to direct light into at least one or the first image capture path and the second image capture path.

6. The end effector calibration assembly of clause 1, further comprising: a first backlight assembly positioned in opposition to the first camera assembly so as to direct a first light along the first image capture path; and a second backlight assembly positioned in opposition to the second camera assembly so as to direct a second light along the second image capture path.

7. The end effector calibration assembly of clause 1, wherein the electronic controller identifies a particular robot end effector based on the image data received from the first camera assembly and the second camera assembly.

8. An end effector calibration system, comprising: an electronic controller; a robotic arm communicatively coupled to the electronic controller; a robot end effector coupled to an end of the robotic arm; a first camera assembly communicatively coupled to the electronic controller; and a second camera assembly communicatively coupled to the electronic controller, wherein a first image capture path of the first camera assembly intersects a second image capture path of the second camera assembly, wherein the electronic controller: moves the robotic arm such that the robot end effector is positioned within the first image capture path and the second image capture path; receives image data from the first camera assembly; receives image data from the second camera assembly; and calibrates a position of the robot end effector based on the image data received from the first camera assembly and the second camera assembly.

9. The end effector calibration system of clause 8, wherein the electronic controller adjusts a position of the robot end effector with the robotic arm to capture image data of multiple orientations of the robot end effector.

10. The end effector calibration system of clause 8, wherein the first image capture path is directed to intersect the second image capture path orthogonally.

11. The end effector calibration system of clause 8, further comprising a housing comprising: a first side wall; and a second side wall coupled to the first side wall, wherein: the first camera assembly is mounted to the first side wall; and the second camera assembly is mounted to the second side wall and is positioned orthogonal to the first camera assembly.

12. The end effector calibration system of clause 11, wherein the housing comprises an enclosure having an opening configured to receive the robot end effector therethrough.

13. The end effector calibration system of clause 8, further comprising one or more backlight assemblies positioned to direct light into at least one or the first image capture path and the second image capture path.

14. The end effector calibration system of clause 8, further comprising: a first backlight assembly positioned in opposition to the first camera assembly so as to direct a first light along the first image capture path; and a second backlight assembly positioned in opposition to the second camera assembly so as to direct a second light along the second image capture path.

15. The end effector calibration system of clause 8, wherein the electronic controller identifies a particular robot end effector based on the image data received from the first camera assembly and the second camera assembly.

16. A method for calibrating a position of a robot end effector, the method comprising: positioning the robot end effector simultaneously within a first image capture path of a first camera assembly and a second image capture path of a second camera assembly; and calibrating a position of the robot end effector based on the image data received from the first camera assembly and the second camera assembly.

17. The method of clause 16, wherein calibrating a position of the robot end effector based on the image data received from the first camera assembly and the second camera assembly comprises: processing image data from the first camera assembly to determine a first position of the robot end effector within a first plane perpendicular to the first image capture path; and processing image data from the second camera assembly to determine a second position of the robot end effector within a second plane perpendicular to the second image capture path.

18. The method of clause 17, further comprising adjusting a position of the robot end effector within the first image capture path and the second image capture path.

19. The method of clause 17 further comprising backlighting the robot end effector with one or more backlight assemblies.

20. The method of clause 19, further comprising identifying a particular robot end effector based on the image data received from the first camera assembly and the second camera assembly.

It should now be understood that embodiments of the present disclosure are directed to end effector calibration assemblies, systems, and methods. In particular, an end effector calibration system may include, but is not limited to, a first camera assembly and a second camera assembly, wherein a first image capture path of the first camera assembly intersects a second image capture path of a second camera assembly. Image data received from the first and second camera assemblies may allow an electronic controller to quickly and effectively calibrate a position of the robot end effector, and specifically, the tip of the robot end effector. In some cases, the electronic controller may also recognize the type of tool and adjust calibration calculations accordingly. Moreover, in some cases, the electronic controller may be configured to process image data to determine wear on the end effector, that the robot end effector is properly assembly to the robotic arm, or other characteristics of the robot end effector.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An end effector calibration assembly, comprising:
   an electronic controller;
   a first camera assembly communicatively coupled to the electronic controller;
   a second camera assembly communicatively coupled to the electronic controller, wherein a first image capture path of the first camera assembly intersects a second image capture path of the second camera assembly, and
   a first backlight assembly positioned in opposition to the first camera assembly so as to direct a first light along the first image capture path; and
   a second backlight assembly positioned in opposition to the second camera assembly so as to direct a second light along the second image capture path, wherein the first backlight assembly and the second backlight assembly are communicatively coupled to the electronic controller, and
   wherein the electronic controller:
      receives first image data from the first camera assembly;
      receives second image data from the second camera assembly;
      identifies a particular robot end effector type based on the first image data and second image data received from the first camera assembly and the second camera assembly respectively;
      controls the one or more backlight assemblies to provide a plurality of lighting scenarios for calibration; and
      calibrates a position of a robot end effector based on the first image data and second image data received from the first camera assembly, the second camera assembly, and the particular robot end effector type.

2. The end effector calibration assembly of claim 1, wherein the first image capture path is directed to intersect the second image capture path orthogonally.

3. The end effector calibration assembly of claim 1, further comprising a housing comprising:
   a first side wall; and
   a second side wall coupled to the first side wall, wherein:
      the first camera assembly is mounted to the first side wall; and
      the second camera assembly is mounted to the second side wall and is positioned orthogonal to the first camera assembly.

4. The end effector calibration assembly of claim 3, wherein the housing comprises an enclosure having an opening configured to receive the robot end effector therethrough.

5. The end effector calibration assembly of claim 1, wherein the first and/or second backlight assemblies comprise multi-color lights.

6. An end effector calibration system, comprising:
   an electronic controller;
   a robotic arm communicatively coupled to the electronic controller;
   a robot end effector coupled to an end of the robotic arm;
   a housing comprising a first side wall and a second side wall each defining a port;
   a first camera assembly communicatively coupled to the electronic controller and interchangeably connectable to the housing within the port of the first side wall or the second side wall;
   a second camera assembly communicatively coupled to the electronic controller and interchangeably connectable to the housing within the port of the other of the first side wall or the second side wall;

a first backlight assembly positioned in opposition to the first camera assembly so as to direct a first light along the first image capture path; and a second backlight assembly positioned in opposition to the second camera assembly so as to direct a second light along the second image capture path, wherein the first backlight assembly and the second backlight assembly are communicatively coupled to the electronic controller, wherein a first image capture path of the first camera assembly intersects a second image capture path of the second camera assembly, and wherein the electronic controller:

moves the robotic arm such that the robot end effector is positioned within the first image capture path and the second image capture path;

receives first image data from the first camera assembly;

receives second image data from the second camera assembly;

controls the first and second backlight assemblies to provide a plurality of lighting scenarios for calibration; and calibrates a position of the robot end effector based on the first image data and second image data received from the first camera assembly and the second camera assembly respectively.

7. The end effector calibration system of claim 6, wherein the electronic controller adjusts a position of the robot end effector with the robotic arm to capture image data of multiple orientations of the robot end effector.

8. The end effector calibration system of claim 6, wherein the first image capture path is directed to intersect the second image capture path orthogonally.

9. The end effector calibration system of claim 6, wherein the housing comprises an enclosure having an opening configured to receive the robot end effector therethrough.

10. The end effector calibration system of claim 6, wherein first and second backlight assemblies are configured to be interchangeably connectable to the housing.

11. The end effector calibration system of claim 6, wherein the electronic controller further identifies:

a particular robot end effector type based on the first image data and second image data received from the first camera assembly and the second camera assembly respectively; wherein the electronic controller calibrates a position of the robot end effector based on the first image data and second image data received from the first camera assembly, the second camera assembly, and the particular robot end effector type;

at least one of wear on the robot end effector, improper installation, tool length, tool shape, or surface contaminates based on the first image data and second image data received from the first camera assembly and the second camera assembly respectively.

12. A method for calibrating a position of a robot end effector, the method comprising:

positioning the robot end effector simultaneously within a first image capture path of a first camera assembly and a second image capture path of a second camera assembly with an electronic controller;

receiving first image data from the first camera assembly and second image data from the second camera assembly;

identifying a particular robot end effector type based on the first image data received from the first camera assembly and the second image data from the second camera assembly with the electronic controller;

backlighting the robot end effect with a first backlight assembly positioned in opposition to the first camera assembly so as to direct a first light along the first image capture path and a second backlight assembly positioned in opposition to the second camera assembly so as to direct a second light along the second image capture path;

controlling the one or more backlight assemblies to provide a plurality of lighting scenarios for calibration with the electronic controller; and calibrating a position of the robot end effector based on the first image data received from the first camera assembly, the second image data from the second camera assembly, and the particular robot end effector type.

13. The method of claim 12, wherein calibrating the position of the robot end effector based on the first image data received from the first camera assembly and the second image data from the second camera assembly comprises:

processing the first image data from the first camera assembly to determine a first position of the robot end effector within a first plane perpendicular to the first image capture path; and processing the second image data from the second camera assembly to determine a second position of the robot end effector within a second plane perpendicular to the second image capture path.

14. The method of claim 13, further comprising adjusting a position of the robot end effector within the first image capture path and the second image capture path.

* * * * *